United States Patent [19]

Zakharov et al.

[11] Patent Number: 5,696,044
[45] Date of Patent: Dec. 9, 1997

[54] METHOD OF PRODUCING A DEPOSITED CATALYST FOR THE POLYMERIZATION OF ETHYLENE AND COPOLYMERIZATION OF ETHYLENE WITH O-OLEFINS

[75] Inventors: Vladimir Alexandrovich Zakharov; Sergei Iyanovich Makhtarulin; Sergei Andreevich Sergeev; Tatyana Borisovna Mikenas; Valentin Evgenievich Nikitin; Ljudmila Gennadievna Echevskaya; Angelina Dmitrievna Khmelinskaya, all of Novosibirsk, Russian Federation

[73] Assignee: Institut Kataliza Iment G.K. Boreskova Sibirskogo Otdelenia Rossiiskoi Akademii Nauk, Russian Federation

[21] Appl. No.: 750,694

[22] PCT Filed: Jun. 13, 1995

[86] PCT No.: PCT/RU95/00128

§ 371 Date: Dec. 18, 1996

§ 102(e) Date: Dec. 18, 1996

[87] PCT Pub. No.: WO95/35163

PCT Pub. Date: Dec. 28, 1995

[30] Foreign Application Priority Data

Jun. 20, 1994 [RU] Russian Federation ............ 94022210

[51] Int. Cl.$^6$ ............................................. C08F 4/64
[52] U.S. Cl. ..................... 502/104; 502/126; 502/133; 502/134; 526/125.2; 526/125.7
[58] Field of Search ................... 502/104, 126, 502/133, 134; 526/125.2, 125.7

[56] References Cited

U.S. PATENT DOCUMENTS

| 4,439,541 | 3/1984 | Takitani et al. | 502/125 |
| 5,132,261 | 7/1992 | Murata et al. | 502/116 |

FOREIGN PATENT DOCUMENTS

| 0575840 | 12/1993 | European Pat. Off. . |
| 2529207 | 6/1982 | France . |
| 3626060 | 2/1987 | Germany . |
| 59-53511 | 3/1984 | Japan . |
| 726702 | 2/1978 | U.S.S.R. . |
| 1400657 | 6/1988 | U.S.S.R. . |
| 1080285 | 11/1990 | U.S.S.R. . |
| 1688788 | 10/1991 | U.S.S.R. . |

OTHER PUBLICATIONS

English Abstract of JP 59 53,511 [84 53,511] "Ethylene Copolymers", Jpn. Kokai Tokkyo Koho Sep. 1982.

*Primary Examiner*—David W. Wu
*Attorney, Agent, or Firm*—Ladas & Parry

[57] ABSTRACT

A method is proposed for producing a deposited catalyst for the polymerization of ethylene and copolymerization of ethylene with δ-olefins which involves the reaction of a solution of an organomagnesium compound of composition $MgPh_2 \cdot nMgCl_2 \cdot mR_2O$ (wherein n=0.37–0.7; m≧2, $R_2O$ is a simple ether, Ph is $C_6H_5$) with a carbon tetrachloride, at a molar ratio of $CCl_4/Mg \geq 0.5$ and a temperature of −20° to 60° C.

3 Claims, No Drawings

METHOD OF PRODUCING A DEPOSITED CATALYST FOR THE POLYMERIZATION OF ETHYLENE AND COPOLYMERIZATION OF ETHYLENE WITH O-OLEFINS

The invention relates to methods of producing catalysts for the polymerization of ethylene and copolymerization of ethylene with δ-olefins, more specifically to deposited catalysts comprising a transition metal compound based on magnesium-containing carrier.

THE PRIOR ART

There is known a method of producing deposited ethylene polymerization catalysts comprising a transition metal compound ($TiCl_4$, $VCl_4$, $VOCl_3$) on a carrier of the formula: $Mg_mCl_nC_pHg$ (m=0.80–0.95, n=1.60–1.90, p=0.8–1.6, g=1.4–3.4) (SU 726702 A; SU 1400657 A) by depositing transition metal compounds onto the carrier. In doing so, a carrier is formed by reacting metallic magnesium powder with alkyl chloride in a hydrocarbon medium at a RCl/Mg molar ratio greater than 2.

The main disadvantage of catalysts produced by this method is an uncontrollable granulometric composition of a catalyst powder having a wide catalyst particle size distribution varying from 1 to 100 microns.

As polymerization occurs, a polymer powder having a wide particle size distribution and relatively low bulk density (0.22–0.30 $g/cm^3$) is formed on such a catalyst.

It is known from the prior art that substantial improvement in the method performance can be achieved by producing a polymer powder having narrow particle size distribution and greater bulk density. To this end, polymerization catalysts having narrow particle size distribution and improved morphology are used. In this case, different polymerization technologies and different polymer application require catalysts having different particle size, e.g. 10–25 microns for suspension polymerization of ethylene and 25–50 microns for gas phase polymerization.

A catalyst having narrow particle size distribution comprising magnesium chloride as the carrier can be produced by reaction of a $MgCl_2 \cdot 3\text{-i-}C_8H_{17}OH$ compound solution in a hydrocarbon diluent with $TiCl_4$ in the presence of an electron donor compound such as ethyl benzoate, ethyl anizate, and the like (see Japanese Application No. 59153511). The catalyst thus produced has a particle size of 5–15 microns and has rather high activity (up to 35 kg/PE g per Ti.h.atm $C_2H_4$) and allows one to produce polyethylene powder having narrow granulometry and high bulk density.

The method of producing a catalyst is disadvantageous in that it is carried out at low temperatures (up to minus 20° C.), large amounts of liquid $TiCl_4$ are used as a reaction medium and a considerable amount of hydrogen chloride liberate during synthesis of the catalyst. Besides, this method is used to produce catalysts having a particle size of greater than 15 microns.

There is known a method for the preparation of a catalyst by reaction of a (RMgR'.nAlR"mD) with chlorohydrocarbon and by subsequent reaction of the resulting solid product (carrier) with titanium or vanadium halide (see FRG Patent N 326060 and French Patent N 2529207). The RMgR' organomagnesium compound includes (n-Bu) Mg(i-Bu) or (n-Bu)Mg(Oct) compounds soluble in hydrocarbons, and the chlorohydrocarbon compound is preferably tert-BuCl.

The main disadvantage of the catalysts prepared by this method is that they are not sufficiently active.

DISCLOSURE OF THE INVENTION

The object of the claimed invention is to develop a method of producing catalysts for the polymerization of ethylene and copolymerization of ethylene with δ-olefins. This method makes it possible to produce polymers having narrow and controllable particle size distribution and greater bulk density and retaining high activity during suspension and gas phase polymerization of ethylene and copolymerization of ethylene with δ-olefins.

This object can be attained by using the $Mg(C_6H_5)_2 \cdot nMgCl_2 \cdot mR_2O$ organomagnesium compound (wherein $C_6H_5$ is phenyl, n=0.37, m≧2, $R_2O$ is ether, preferably dibutyl or diisoamyl ether) to prepare a magnesium-containing carrier for these catalysts. An organomagnesium compound is prepared by reacting magnesium powder with chlorobenzene in the presence of ether, preferably dibutyl or dicsoamyl ether. A magnesium containing carrier can be prepared by reacting a solution of the above-mentioned organomagnesium compound with carbon tetrachloride at temperatures between −20° C. to 60° C. and a $CCl_4$/Mg molar ratio of equal or greater than 0.5. At this stage, a magnesium-containing carrier powder is formed. This powder has the required particle size and narrow particle size distribution in the form of a suspension in the solvent used. Catalysts are prepared by subsequent treatment of a magnesium-containing carrier with a solution of $TiCl_n$, $VCl_4$ or $VOCl_3$ in a hydrocarbon solvent at a Ti(V)/Mg molar ratio of 0.2–1.0 and at temperatures between 20° C. and 100° C.

The main distinctive feature of the claimed method for the preparation of catalysts is using a $Mg(C_6H_5)_2 \cdot nMgCl_2 \cdot mR_2O$ complex organomagnesium compound in solution form in chlorobenzene, ether $R_2O$ or mixtures of chlorobenzene with ether, chlorobenzene with aliphatic or aromatic compounds at the magnesium-containing carrier preparation stage. Chlorination of this compound with carbon tetrachloride at temperatures between −20° C. and 60° C. and a $CCl_4$/Mg molar ratio of equal or greater than 0.5 gives a solid magnesium containing carrier powder suspended in a hydrocarbon solvent. The carrier thus prepared has a narrow particle size ranging from 5 to 50 microns. The required particle size of a carrier and respectively a catalyst in this range is predetermined by the organomagnesium compound composition and the conditions under which an organomagnesium compound is reacted with carbon tetrachloride. The resulting magnesium containing carrier includes preferably magnesium dichloride (80–90 wt %), ether (7–15 wt %), and complex hydrocarbon products (1–5 wt %). A catalyst is prepared by subsequent treatment of the carrier with solution of titanium tetrachloride $TiCl_4$ or vanadium chloride ($VCl_4$, $VOCl_3$) in a hydrocarbon solvent.

The claimed method makes it possible to prepare highly active catalysts having narrow particle size distribution for various applications and accordingly various particle sizes. For example, as is evident from the present invention, one can produce catalysts with a particle size of 5–10 microns and 10–25 microns for suspension polymerization of ethylene and catalysts with a particle size of 20–50 microns for gas phase polymerization of ethylene. As ethylene polymerization occurs, polyethylene having high bulk density (greater than 0.35 $g/cm^3$) and narrow particle size distribution (a SPAN value less than 1) is formed on this catalyst. The use of titanium chloride as an active component in these catalysts gives polyethylene having narrow molecular weight distribution which is defined by the $MI_5/MI_2$ ratio of equal or greater than 3.1 (Examples 1–6 in the table), and the use of vanadium chloride provides polyethylene having wide molecular weight destribution ($MI_5/MI_2$ value is greater than 4, Examples 8 and 9 in the table). Activity of the resulting catalysts amounts to 140 kg polyethylene (PE)/g Ti.h.atm $C_2H_4$ or 20 kg PE/g V.h. atm $C_2H_4$. Catalysts are used for the polymerization of ethylene or copolymerization of ethylene with δ-olefins in combination with a aluminium trialkyl cocatalyst (preferably aluminium triisobutyl or aluminium triethyl). Polymerization is carried out under suspension conditions at temperatures between 50° C. and 100° C. in a hydrocarbon solvent, (e.g. hexane or heptane) or under gas phase conditions without a hydrocarbon diluent at temperatures between 60° C. and 100° C. and at pressures ranging from 2 to 40 atm. The polymer molecular weight regulator is hydrogen in an amount of 5–50% by volume. During copolymerization of ethylene with δ-olefins, propylene, butene-1, hexene-1, 4-methylpentene-1 or other higher δ-olefins are used.

The essence of the present invention is illustrated by the following examples.

EXAMPLE 1

A. Preparation of an Organomagnesium Compound Solution

In a 1 l glass reactor provided with a stirrer and a thermostating device 29.2 g of magnesium powder (1.2 mole) are reacted with 450 ml of chlorobenzene (4.4 mole) in the presence of 203 ml of dibutyl ether (1.2 mole) and an activating agent which is essentially a solution of 0.05 g of iodine in 3 ml of butyl chloride. The reaction is carried out in an atmosphere of inert gas (nitrogen and argon) at a temperature between 80° C. and 100° C. for 10 hours. On completion of the reaction, the resulting reaction mixture is allowed to settle and the liquid phase is separated from the precipitate. The liquid phase is essentially a $MgPh_2.0.49$ $MgCl_2.2(C_4H_9)_2O$ organomagnesium compound solution having a concentration of 1.1 Mg mole/l.

B. Synthesis of a Carrier 100 ml of the resulting solution (0.11 Mg mole) are charged into a reactor provided with a stirrer and 21.2 ml of $CCl_4$ solution in 42 ml of heptane (0.22 $CCl_4$ mole) are dosed into the reactor at a temperature of 20° C. for 1 hour. The reaction mixture is maintained at this temperature, and after stirring for 60 minutes, the mother liquor is then removed, and the precipitate thus formed is washed with heptane four times in 100 ml portions at a temperature of 60 C to give 11.8 g of organomagnesium carrier powder in the form of a slurry in heptane.

Preparation of a Catalyst 12.1 ml of $TiCl_4$ ($TiCl_4$/Mg=1) are poured to the resulting magnesium-containing carrier slurry in heptane, the reaction mixture is heated to 80° C. and maintained under stirring for 2 hours, the solid residue is then allowed to settle and washed with heptane at a temperature of 60° C. four times in 100 ml portions, to give a deposited catalyst containing 21.3 wt % titanium. The average particle size is 13 microns.

Ethylene polymerization is carried out in a 0.7 l steel reactor provided with a stirrer and a thermostating jacket. The solvent used in the polymerization process includes a n-fexane (2.50 ml) and a $Al(i-Bu)_3$ cocatalyst having a 5 mmole/l concentration. The polymerization is carried out at a temperature of 80° C., an ethylene pressure of 3.5 atm. a hydrogen pressure of 1 atm for 1 hour. The ethylene polymerization results are summarized in the table. To carry out a test, 0.009 g of a catalyst is used to give 39 g of a polymer. The catalyst activity is 4.3 kg PE/g catalyst per hour or 187 kg/g Ti per hour. The PE melt index ($MI_5$) at a load of 5 kg and a temperature of 190° C. is 6.7 g/10 min, and the index ratio at loads of 5 kg and 2.16 kg is 3.1.

The PE powder bulk density is 0.37 g/cm³, and the average PE particle size as measured by screen analysis is 280 microns. The PE powder has narrow particle size distribution which is determined by the SPAN value calculated from the screen analysis data: SPAN=($d_{90}$−$d_{10}$) $d_{50}$ wherein $d_{90}$, $d_{10}$ and $d_{50}$ are PE particle size corresponding to the integral content of particles in amounts of 90, 50 and 10 wt %, respectively. The SPAn value for this example is 0.75.

EXAMPLE 2

An organomagnesium compound solution is prepared as in Example 1 except that diisoamyl ether is used instead of dibutyl ether, and the reaction is carried out at temperatures between 80° C. and 130° C. to give a $MgPh_2.0.37$ $MgCl_2.2DIIAI$ organomagnesium compound solution having a 0,93 Mgmole/l concentration.

The carrier and the catalyst are synthesized as in Example 1 to give a catalyst having 3.0 wt % titanium and an average particle size of 13.6 microns. The catalytic properties of the catalyst summarized in tabular form.

EXAMPLE 3

An organomagnesium compound solution is prepared as in Example 1 except that 122 ml of chlorobenzene (1.1 mole) and 450 ml of dibutyl ether are used to give a $MgPh_2.0.7$ $MgCl_2$ nDBE organomagnesium compound solution in dibutyl ether (wherein n is more than 2) having a 1.2 Mg mole/l concentration.

A carrier is synthesized as follows. A carbon tetrachloride solution in dibutyl ether (14 ml of $CCl_4$ in 28 ml of DBE) is added to 100 ml of an organomagnesium compound solution (0,12 mole) at a temperature of 30° C. for 1,5 hours. Subsequent thermal treatment at 85° C. and washings are effected as in Example 1.

The catalyst is produced as in Example 1, but the $TiCl_4$/Mg molar ratio is 0.5 to give a catalyst containing 1.65 wt % titanium and having an overage particle size of 14 microns. The catalyst properties of the catalyst are summarized in tabular form.

EXAMPLE 4

An organomagnesium compound solution is synthesized as in Example 1. A carrier is synthesized by adding a carbon tetrachloride solution in chlorobenzene (14 ml of $CCl_4$ in 14 ml of chlorobenzene) to 100 ml of an organomagnesium compound solution at a temperature of minus 10° C. for 1.5 hours. Subsequent operations of catalyst synthesis are carried out as in Example 1 to give a catalyst containing 2.5 wt % titanium and having an average particle size of 6 microns. The catalytic properties of the catalyst are summarized in tubular form.

EXAMPLE 5

An organomagnesium compound solution is prepared as in Example 1 except that a chlorobenzene/toluene mixture (250 ml of chlorobenzene and 250 ml of toluene) is used instead of chlorobenzene to give a $MgPh_2.0,6$ $MgCl_2$ .2 DBE organomagnesium compound solution having 0,85 Mg mole/l concentration.

The carrier is synthesized as in Example 1 except that a $CCl_4$ solution in toluene is used.

The catalyst is prepared as in Example 1 to give a solution containing 5.3 wt % titanium and having an average particle size of 10 microns. The catalytic properties of the catalyst are summarized in tabular form.

EXAMPLE 6

An organomagnesium compound solution is synthesized as in Example 1.

A $ClC_4$ solution in DBE (14 ml of $CCl_4$ in 28 ml of DBE) is added to 100 ml of an organomagnesium compound solution having 1.1 Mg mole/l concentration under stirring at 36° C. for 40 minutes. On completion of addition, the temperature is raised to 80° C. and the reaction mixture is maintained at the given temperature and stirred for 1 hour, the mother liquor is then removed and the carrier is washed three times with 150 ml of n-hexane at 50°–60° C.

13 ml of $TiCl_4$ ($TiCl_4$/Mg=1) is added by portions to the resulting carrier in n-hexane at 20° C., the reaction mixture is heated to 60° C. and maintained under stirring for 1.5 hours. The catalyst is washed at the given temperature six times with 150 ml of n-hexane to give a catalyst containing 2.0 wt % titanium having an average particle size of 18.8 microns.

The catalyst properties of the catalyst are summarized in tabular form.

EXAMPLE 7

An organomagnesium compound solution is synthesized as in Example 2.

Carrier synthesis is carried out as in Example 6 except that the organomagnesium compound is reacted with $CCl_4$ at a temperature of 50° C., and the $CCl_4$/Mg ratio is 3.

Catalyst synthesis is carried out as in Example 6. The resulting catalyst contains 1.7 wt % titanium and has an average particle size of 38 microns. The catalytic properties of the catalyst are summarized in tabular form.

EXAMPLE 8

An organomagnesium compound solution is synthesized as in Example 1.

Carrier synthesis is carried out as in Example 6 except that the organomagnesium compound is reacted with $CCl_4$ at a temperature of 38° C. The resulting carrier is treated with a solution at 40° C. for 2 hours and then washed four times with 100 ml of n-hexane.

Catalyst synthesis is carried out by treatment of the carrier at 40° C. for 1 hour with a $VOCl_3$ solution in $CCl_4$ (2 ml of the solution having $VOCl_3$/ 1.6 mole/ml concentration. The catalyst is washed two times with 70 ml n-hexane. The resulting catalyst contains 2.3 wt % vanadium and has an average particle size of 20 microns. The catalytic properties of the catalyst are summarized in tabular form.

EXAMPLE 9

An organomagnesium compound solution is synthesized as in Example 2.

Carrier synthesis is carried as in Example 8 except that the organomagnesium compound is reacted with $CCl_4$ at a temperature of 50° C.

Subsequent operations of synthesis of the carrier and the catalyst are carried out as in Example 8 except that vanadium tetrachloride is used instead of vanadium oxytrichloride to give a catalyst which contains 2.1 wt % vanadium and has an average particle size of 37 microns. The catalyst properties of the catalyst are summarized in tabular form.

EXAMPLE 10

The catalyst produced in Example 4 is used for the preparation of polyethylene powder having superhigh molecular weight. Polymerization is carried out at a temperature of 70° C. in n-hexane (300 ml) with a Al(i-Bu) cocatalyst (3 mmole(1) at an ethylene pressure of 3 atm for 2 hours. 0.007 g of catalyst is used to give 84 g of polyethylene. The PE yield is 12/kg PE/g catalyst or 480 kg/g Ti. The bulk density of the PE powder is 0.38 g/cm$^3$, the average PE particle size is 150 microns and the SPAN value is 0.68. Polyethylene has an average viscosity molecular weight of $1.8 \cdot 10^6$.

EXAMPLE 11

The catalyst produced in Example 6 is used for the polymerization of ethylene with hexene-1. Copolymerization is carried out at a temperature of 70° C. in hexane (250 ml) with a Al(i-Bu)$_3$ cocatalyst (5 mmoles) 1 at an ethylene pressure of 2 atm and a hydrogen pressure of 0.25 atm, 10 ml of hexene-1 are charged into a reactor, the hexene-1/ethylene molar ratio is 2.4.0.006 t of catalyst is used, the reaction is carried out for 30 minutes to give 12 g of copolymer.

The catalyst activity is 4.0 kg/g catalyst.h or 200 kg/g Ti.h. The copolymer has a melt index $MI_5$ of 0.8 g/10 min and contains 4.5 mole % hexene-1.

Industrial applicability

The claimed method for preparing deposited catalysts for the polymerization of ethylene and copolymerization or ethylene with δ-olefins will find applications to prepare catalysts, and catalysts produced by the claimed method will find applications in solution, suspension and gas phase ethylene polymerization.

TABLE

| | | | Data on Ethylene Polymerization | | | | | | |
|---|---|---|---|---|---|---|---|---|---|
| | Tit. | | Activity | | $MI_5$ | | | | |
| Exp. No. | content, wt % | d avr[1] | Kg PE g cat · h | Kg PE g Ti (V) · h | g 10 min | $MI_5$[2] $MI_2$ | $d_{30}$[3] | B · D.[5] g/cm$^3$ | SPAN[4] |
| 1 | 2.3 | 13.0 | 4.3 | 187 | 6.7 | 3.1 | 280 | 0.37 | 0.74 |
| 2 | 3.0 | 13.6 | 4.7 | 157 | 8.2 | 3.0 | 298 | 0.38 | 0.75 |
| 3 | 1.65 | 14.0 | 8.0 | 485 | 3.4 | 3.1 | 364 | 0.36 | 0.98 |
| 4 | 2.5 | 6.0 | 8.5 | 340 | 2.6 | 3.0 | 160 | 0.36 | 0.65 |
| 5 | 5.3 | 10.0 | 10.0 | 189 | 6.3 | 3.1 | 280 | 0.36 | 0.75 |

TABLE-continued

Data on Ethylene Polymerization

| Exp. No. | Tit. content, wt % | d avr[1] | Activity Kg PE g cat·h | Activity Kg PE g Ti (V)·h | $MI_5$ g 10 min | $ML_5^{2)}/MI_2$ | $d_{30}^{3)}$ | B·D.[5] g/cm³ | SPAN[4] |
|---|---|---|---|---|---|---|---|---|---|
| 6 | 2.0 | 18.8 | 5.0 | 250 | 2.8 | 3.0 | 415 | 0.39 | 1.0 |
| 7 | 1.7 | 38.0 | 2.8 | 165 | 5.6 | 3.2 | 690 | 0.36 | 0.78 |
| 8 | 2.3 | 20.0 | 2.7[6] | 118 | 1.4 | 4.5 | 364 | 0.36 | 0.71 |
| 9 | 2.1 | 37.0 | 3.2[6] | 152 | 0.7 | 4.7 | 710 | 0.38 | 0.73 |

[1] average catalyst particle size
[2] Polymer melt index ratio at loads of 5 kg and 2.16 kg which indicate polyethylene molecular weight distribution
[3] average PE particle size
[4] SPAN value indicates width of PE particle size distribution
[5] PE bulk density
[6] Polymerization at ethylene pressure of 7.5 atm, hydrogen pressure of 0.5 atm for 1 hour

We claim:

1. A method of producing a deposited catalyst for the polymerization of ethylene and copolymerization of ethylene with δ-olefins which comprises reacting a solution of an organomagnesium compound with an organic halide and subsequently treating the resulting carrier with titanium or vanadium compounds, characterized in that the organomagnesium compound is a product of composition $MgPh_2 \cdot nMgCl_2 \cdot mR_2O$ (wherein n=0.37–0.7; m≧2; $R_2O$ is an ether; Ph is phenyl) which is reacted with an organic halide at an organic halide to magnesium molar ratio of ≧0.5 and at temperatures of –20° C. to 60° C.

2. The method according to claim 1, characterized in that the organomagnesium compound is produced by reacting metallic magnesium with chlorobenzene in the presence of dibutyl or diisoamyl ether.

3. The method according to claim 1, characterized in that the organic halide is carbon tetrachloride.

* * * * *